(12) United States Patent
Longo et al.

(10) Patent No.: US 11,697,914 B2
(45) Date of Patent: Jul. 11, 2023

(54) SYSTEM AND METHODS FOR IN SITU RECOVERY AND PROCESSING OF RECOVERED SOLUTIONS

(71) Applicant: Denison Mines Corp., Toronto (CA)

(72) Inventors: Peter Longo, Saskatoon (CA); Chad Anthony Sorba, Saskatoon (CA); Greg P. Newman, Saskatoon (CA); Lori L. Newman, Saskatoon (CA); Weston Garrett Hubele, Mills, WY (US); Douglass Howard Graves, Belgrade, MT (US); Brian Michael Pile, Casper, WY (US); Dany Bernard, Langham (CA); Sandy Debusschere, Carlyle (CA); Charity Brown, Carlyle (CA); Lonnie Lischka, Calgary (CA)

(73) Assignee: Denison Mines Corp., Toronto (CA)

( * ) Notice: Subject to any disclaimer, the term of this patent is extended or adjusted under 35 U.S.C. 154(b) by 674 days.

(21) Appl. No.: 16/572,412

(22) Filed: Sep. 16, 2019

(65) Prior Publication Data
US 2020/0088010 A1   Mar. 19, 2020

Related U.S. Application Data

(60) Provisional application No. 62/731,646, filed on Sep. 14, 2018.

(51) Int. Cl.
*E02D 19/14* (2006.01)
*C22B 3/04* (2006.01)
(Continued)

(52) U.S. Cl.
CPC .......... *E02D 19/14* (2013.01); *C22B 60/0204* (2013.01); *C22B 60/0226* (2013.01);
(Continued)

(58) Field of Classification Search
CPC . C22B 60/0226; C22B 60/0278; E21B 43/28; E21B 43/30; E02D 19/14
See application file for complete search history.

(56) References Cited

U.S. PATENT DOCUMENTS 2,839,358 A * 6/1958 Price .................. C22B 60/0278
423/16
3,860,289 A * 1/1975 Learmont .............. E21B 43/28
423/20
(Continued)

FOREIGN PATENT DOCUMENTS

WO   2012/016511 A1   2/2012
WO   2015/100481 A1   7/2015

OTHER PUBLICATIONS

Muntean, S.; International Search Report issued in connection with corresponding PCT Application No. PCT/CA2019/051312; search completed Nov. 4, 2019.

*Primary Examiner* — Janine M Kreck
(74) *Attorney, Agent, or Firm* — Christopher N. Hunter; Laurie Wright; Blake, Cassels & Graydon LLP

(57) ABSTRACT

A method and system are provided for the creation of vertical and horizontal freeze wells, in a dome-like pattern around the ore body, as a hydraulic barrier to ensure the ISR mining solution and the mined minerals do not flow out of the ore body. A method to formulate a suitable mining solution used for ISR mining, where the lixivant does not freeze when using the freeze dome containment method and where the resulting PLS has a high concentration of dissolved minerals and thus eliminates the need for the solvent extraction/ion exchange step during processing is also described.

36 Claims, 13 Drawing Sheets

(51) Int. Cl.
  *C22B 60/02* (2006.01)
  *E21B 43/30* (2006.01)
  *E21B 43/28* (2006.01)
  *E21B 36/00* (2006.01)
  *C01G 43/025* (2006.01)

(52) U.S. Cl.
  CPC .............. *E21B 43/28* (2013.01); *E21B 43/30* (2013.01); *C01G 43/025* (2013.01); *C22B 3/04* (2013.01); *E21B 36/001* (2013.01); *E21B 43/305* (2013.01)

(56) References Cited

U.S. PATENT DOCUMENTS

| | | | | |
|---|---|---|---|---|
| 4,247,522 A * | 1/1981 | Pyman | ................ | C01B 15/0475 423/16 |
| 4,311,340 A * | 1/1982 | Lyons | .................... | E21B 43/28 166/281 |
| 9,016,370 B2 * | 4/2015 | Daub | ...................... | E21B 36/04 166/302 |
| 2011/0298270 A1 * | 12/2011 | Duyvesteyn | ........ | C22B 23/0415 166/57 |

* cited by examiner

SYSTEM AND METHODS FOR IN SITU RECOVERY AND PROCESSING OF RECOVERED SOLUTIONS

CROSS-REFERENCE TO RELATED APPLICATION(S)

This application claims the benefit of priority to U.S. Provisional Patent Application No. 62/731,646 filed on Sep. 14, 2018, the contents of which are incorporated herein by reference.

TECHNICAL FIELD

The following relates generally to mining of mineral resources, and more specifically mining by way of in situ recovery or in situ leaching.

BACKGROUND

In Situ Recovery (ISR), also known as solution mining or in situ leaching, is an established mining method used in the mining industry for the extraction of uranium and other minerals. In a typical ISR operation, a mining solution, which may be referred to as a lixiviant, is pumped through an underground ore body to dissolve (or leach) the minerals while they remain "in-situ" underground. After dissolution, the mining solution containing the dissolved ore, often referred to as the "pregnant solution", is pumped to surface. Once at the surface, the solution is transported to a processing plant for the desired minerals to be recovered by chemically separating the desired mineral from the mining solution.

ISR operations have many advantages over conventional mining operations, including, for example, minimal surface disturbance, no tailings production, minimal waste rock being generated, low noise, dust and air emissions, potentially low water consumption levels, insensitivity to ore grades (i.e. where lixiviants dissolve the desired mineral at any grade), comparatively low operating and capital costs, and potentially high rates of production.

A conventional non-ISR processing plant receives its feed from an underground or open pit mine, where broken-up rocks from the ore body are brought to the plant for "milling" and further processing. As a result, conventional non-ISR processing plants require several circuits to separate the desired mineral from waste rock and other materials. The circuits may comprise the steps of crushing, grinding, leaching, solid/liquid separation, mineral extraction, precipitation, and drying and packaging. Solvent extraction (SX) technology is typically used in conventional milling operations and is generally suited to separate out the targeted mineral (or impurities) in higher concentrations (g/l range). The residual mineralized solution is precipitated (chemically separated) only after completion of SX, which can be time consuming or costly.

In ISR operations, there is no need for crushing, grinding or leaching, as the input to the processing plant is a mineral rich pregnant solution, rather than rock fragments. An ion exchange (IX) process is often used in ISR operations in order to concentrate the minerals in the pregnant solution or eliminate other impurities, as an alternative to SX. IX is often required to increase the mineral concentration to a level that is efficient for precipitation, meaning that the residual mineralized solution will only be precipitated after completion of IX, which can be time consuming and/or costly.

Not all mineral resources, however, are amenable to ISR mining applications. Generally, for a mineral deposit to be considered viable for ISR extraction, the mineralization is: hosted in a permeable rock allowing the lixiviant to flow through the ore body and interact with the mineralization, readily dissolvable by the lixiviant, and situated in an environment that allows for the containment of the lixiviant to facilitate leaching and the associated recovery of the resultant pregnant solution.

The ability to contain the lixiviant is as salient an element of an ISR mining operation as is the ability to access and dissolve the desired mineral from the host rock. Containment prevents outflow of the lixiviant and pregnant solution into the regional groundwater, thereby maximizing recovery of the mineralization (reducing loss into as well as dilution of the lixiviant with regional groundwater) and minimizing the potential for environmental damage. Without adequate containment, ISR mining operations could be uneconomic and harmful to the environment.

In conventional ISR operations, containment of lixiviant and pregnant solution is typically achieved by relying on a combination of natural impermeable layers in the geological strata and/or by creating a natural drawdown of the water table towards the ore body (i.e. pumping more solution out of the ground than is injected into the ground). For example, typical ISR operations often have an aquitard above and below the mining horizon, naturally isolating mining from the surrounding ground water above or below the ore body. Additional recovery wells are then installed from surface to surround the lateral extents of the ore body to achieve the drawdown of the water table towards the ore body.

Due to these requirements, it has been recognized that using conventional ISR mining methods may not be efficient or practical in certain mining environments.

SUMMARY

In one aspect, there is provided a system for forming an artificial containment around an ore body where a naturally occurring aquitard is absent or insufficient. More specifically, there is provided a freeze wall system that can be formed to serve as an artificial form of containment. The freeze wall is preferably achieved by drilling a series of cased drill holes, completed using directional drilling technology, that are drilled from surface over the top or adjacent to the ore body to collectively form an arch pattern that is anchored (or "keyed") into the underlying basement rock on all sides of the ore body to create a "dome" that encapsulates and contains the ore body. In an ISR mining context, the freeze wall creates a hydraulic barrier which contains the lixiviant introduced into the ore body whilst not freezing the ore body itself and eliminating the permeability of the host rock necessary to achieve ISR mining. Installation and casing designs can be used to prevent leakage of the freeze solution used in ground freezing applications into the ground outside of the freeze wall containment zone.

In another aspect there is provided a method of recovering a mineral (for example uranium) from an ore body using an ISR mining method that is a closed loop or near closed loop for processing. The method comprises forming an artificial containment around an ore body (for example, by creating the aforementioned freeze dome), drilling injection and recovery wells from above ground in a pattern, formulating a lixiviant solution, injecting the lixiviant solution into the injection well to dissolve/mobilize the ore and form a uranium rich or pregnant leach solution (PLS), pumping the PLS to the surface using the recovery wells, transporting the PLS to a processing plant using a piping system, processing the PLS to produce a finished product (yellowcake, for uranium), and once the product is precipitated from the PLS, the reconditioning of the lixiviant to be re-injected into the ore body for further mineral extraction.

In implementation, the piping system is preferably freeze-protected and/or insulated to ensure continuous flow of lixiviant and PLS throughout the ISR operation and in cold weather. The piping system is preferably also monitored remotely on an ongoing basis. The pattern of drilling or installing ISR wells is such that they do not intersect or disrupt any of the infrastructure required to achieve an artificial containment (for example, lateral freeze holes used to create the aforementioned freeze dome). Similarly, insulated well casings can be used to ensure that the lixiviant (or PLS) does not freeze when it passes through the artificial containment (for example, the aforementioned freeze dome).

In certain implementations, the lixiviant formulation could be designed to: (a) mobilize sufficiently high grade concentrations of the targeted minerals to not require either IX or SX in processing prior to precipitation of the mineralization from the PLS, and (b) to resist freezing in temperatures as low as −30° C. as a result of the cold geographic conditions or as a result of artificial containment conditions (such as those in the case of the aforementioned freeze dome). Such a lixiviant would be tailored to match the ore body constituents to maximize economic recoveries of the mineral, and minimize recoveries of impurities.

In yet another aspect, there is provided a method of processing the PLS recovered from ISR mining. The PLS processing method comprises the conversion of a mineral rich PLS solution into the extracted mineral (with uranium, a packaged drum of yellowcake); wherein a solvent extraction or ion exchange step is eliminated due to lixiviant formulation and PLS mineral concentration. In an implementation, the lixiviant is formulated such that it can mobilize high concentrations of the targeted mineral and eliminate the need for IX or SX steps to be carried out during processing. Furthermore, the lixiviant is formulated such that it can resist freezing in low temperatures. Such a lixiviant could be tailored to match the ore body constituents to maximize economic recoveries of the targeted mineral and minimize recoveries of impurities.

BRIEF DESCRIPTION OF THE DRAWINGS

Embodiments now can be described with reference to the appended drawings wherein.

DETAILED DESCRIPTION

It has been recognized that using conventional ISR mining methods may not be efficient or practical for the extraction of certain ore or mineral deposits (e.g., uranium). For instance, where natural geologic methods of containment of the lixiviant or pregnant solution are not available, current convention would require mining by an alternate mining method (for example, underground mining or open pit mining). Described herein, the development of a freeze wall 203 that encapsulates the ore body 101 in a domed configuration using a plurality of freeze wells 205, allows for the unique application of ISR mining methods where naturally occurring containment is absent. Once the lixiviant is contained in proximity to the ore body 101, a more efficient method of mineral extraction and processing is possible. This method comprises a closed loop (or near closed loop) extraction process derived from conventional ISR mining methods, whereby a lixiviant is injected into the ore body through an injection well to dissolve/mobilize the ore and form the PLS. The PLS is then pumped to the surface using the recovery wells, transported to a processing plant using a piping system, and processed to produce a finished product. Once the mineralization is precipitated from the PLS, the lixiviant is reconditioned and then re-injected into the ore body for further mineral extraction with minimal discharge of treated effluent to the environment, i.e. to provide a "closed-loop" configuration. The method includes formulating a suitable lixiviant used for in-situ recovery, where the resulting PLS has a high concentration of dissolved mineralization and thus, eliminates the need for the solvent extraction/ion exchange step during processing.

ISR Mining Method

Figure 1:
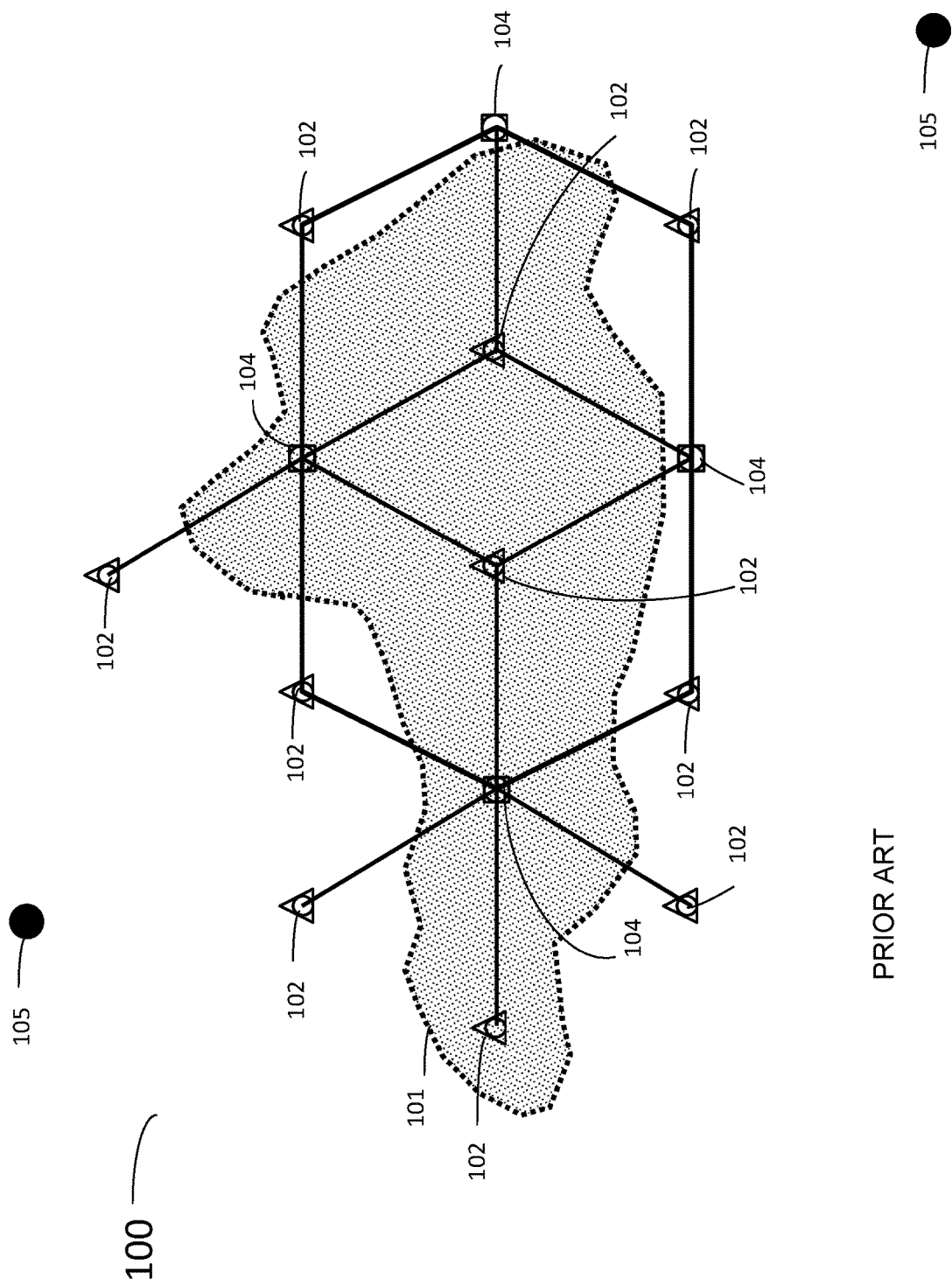
FIG. 1 is a plan view of a typical ISR 7-spot pattern for a set of IRS wells.

FIG. 1 shows a plan view of a typical 7-spot pattern of ISR wells. A wellfield 100 herein refers to a group of injection wells 102, and recovery wells 104 installed and completed in the ore body 101 that are designed to effectively target delineated mineralization and reach desired production goals. The mineralized zones within the ore body 101 are located within a permeable host rock (often a by sandstone unit). When an ISR wellfield is in operation, the lixiviant is pumped into the ore body via injection wells 102, travels through the permeable host rock of the ore body to dissolve/mobilize the ore and is then recovered back to surface as a pregnant solution via recovery wells 104. Additionally, monitoring wells 105 are placed around the wellfield 100 and are used to monitor for excursions outside of the desired mining horizon, and the overall pressure of the system.

Various well patterns are used depending on the shape and extent of the ore body. FIG. 1 illustrates a seven-spot pattern, which is typically of many ISR mining applications. A seven-spot pattern refers to the arrangement in which one recovery well 104 is placed in the center of six injection wells 102. Other patterns, including five-spot, line drive, or staggered line drive patterns, may also be used. A hexagonal arrangement is often preferred but is not necessary. The dimensions of the wells 102, 104 and wellfields 100 may vary. The spacing between wells can also vary, for example between 5 and 15 meters, or various other distances (e.g., between 50 and 100 feet).

Figure 2:
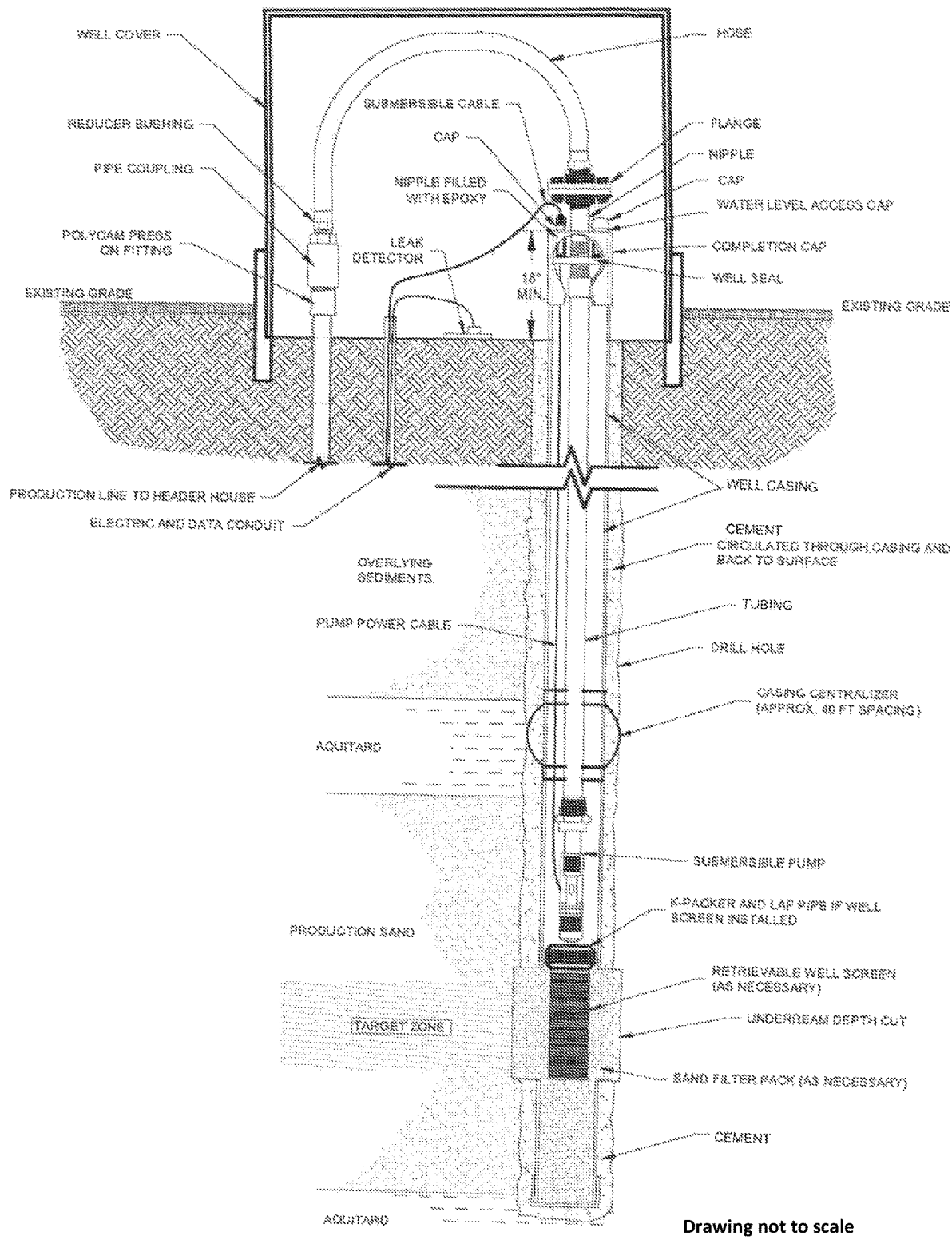
FIG. 2 is a detailed view of a typical recovery well.

FIG. 2 shows an example of a typical well. The wells 102, 104 can be constructed such that they can be used as injection wells 102 or recovery wells 104, interchangeably. This allows the flow direction to be reversed at any time during the production or restoration phases. This could: (1) allow the ore to be more efficiently recovered, and/or (2) facilitate the completion of groundwater restoration. Additionally, a monitoring well 105 can be furnished as either an injection well 102 or recovery well 104 as may be appropriate to control excursions from the mining horizon or to complete restoration activities.

One method of recovering ore from a deposit 101 is to inject a low pH lixiviant into the injection well until it reaches the water-soluble ore 101. The lixiviant mobilizes the ore 101 by dissolving it. The mobilized ore (contained within the PLS) can be pumped to the surface using a recovery well 104. The lixiviant preferably has a low pH to achieve a highly efficient in-situ leaching of the ore, such that the grade of the PLS is high enough to eliminate the need for IX or SX processing steps. The formulation of the lixiviant can be chosen or prepared and can be made uniquely depending upon the ore body constituents.

Figure 3:
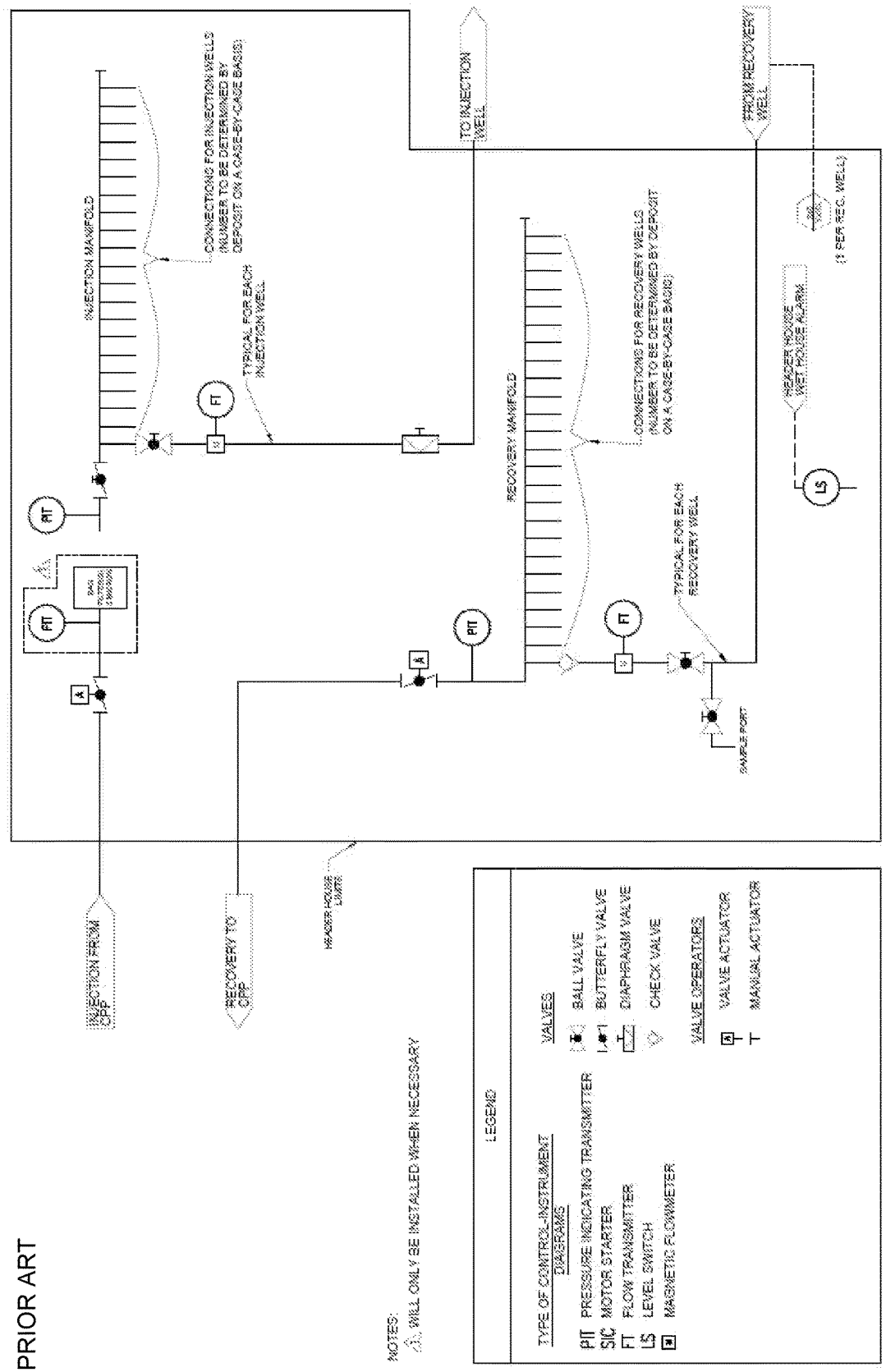
FIG. 3 is a schematic piping diagram for a typical header house.

A heavily monitored, freeze protected piping system can be used to transport the PLS and lixiviant to and from the processing plant. The flow rates and pressures of the individual well lines can be monitored in header houses. FIG. 3 shows a schematic piping diagram for a typical header house. Header house buildings can be used to distribute the mining solution to injection wells and collect the PLS from recovery wells. Each header house would normally be connected to two production trunk lines. One of the trunk lines can be used for receiving lixiviant from the processing plant and the other can be used for conveying PLS back to the processing plant. Each header house includes manifolds, valves, flow meters, pressure meters, and instrumentation, as required, to fully operate and control the process. Flow rate and pressure data can also be transmitted to the processing plant for remote monitoring through a master control system. The master control system allows the user to control the header house production lines remotely. A typical header house can service approximately 80 wells (injection and recovery), depending on resource and pattern configuration.

Figure 4:
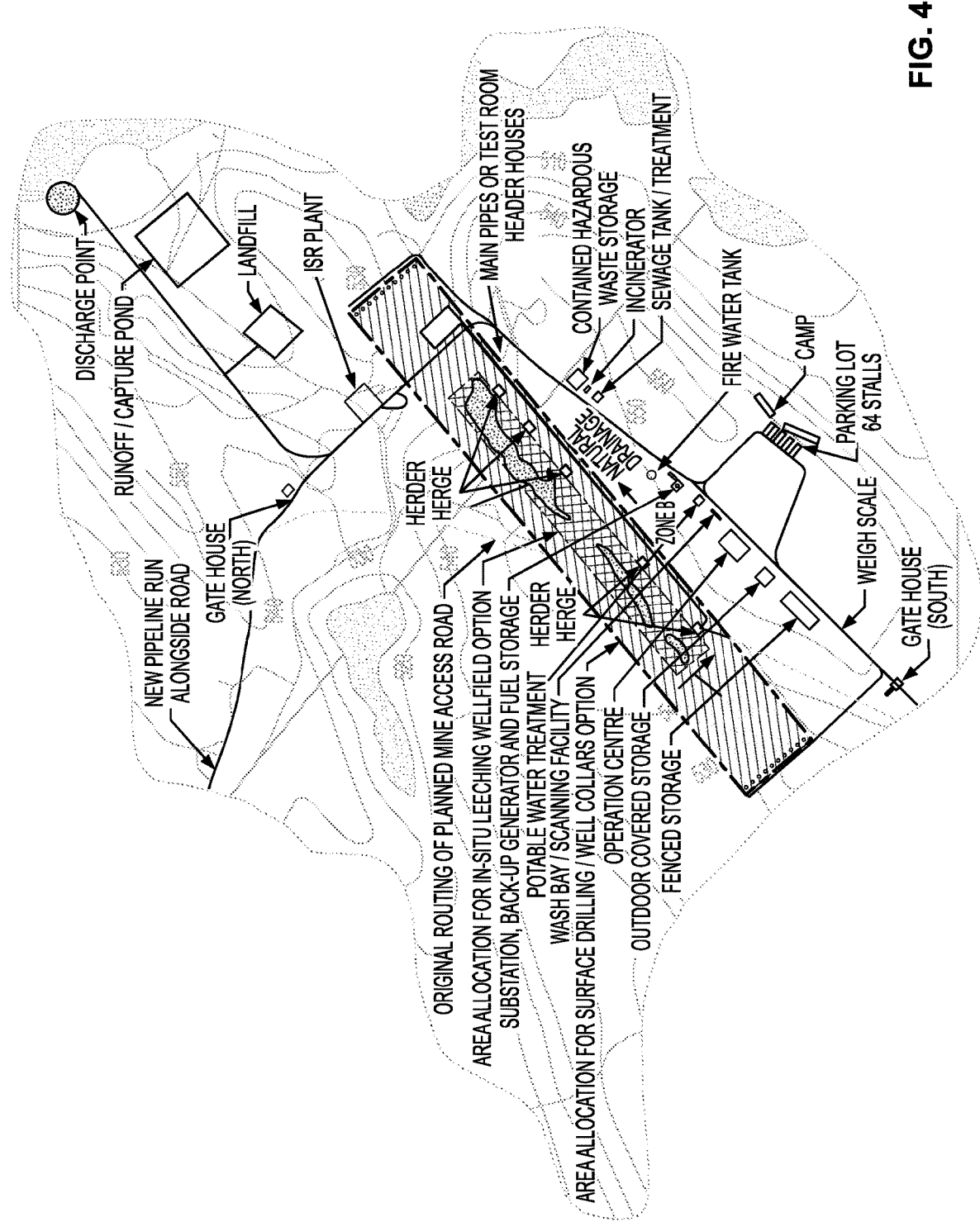
FIG. 4 is a sample plan layout view showing plant, header houses, and well lines.

The lines from the processing plant, header houses, and individual well lines can consist of double contained piping that is designed and selected to meet design operating and environmental conditions. The lines can also be freeze-protected and secured to minimize pipe movement. FIG. 4 illustrates an embodiment of the approximate locations for the processing plant, trunkline, and header houses, which is adapted for the particular site in this example.

The mining method is governed by the rate of mineral extraction and the duration of the mine development, mineral extraction, processing, and closure.

Column leach testing done for a uranium mining operation has showed substantial uranium recovery within the first two pore volumes of lixiviant. Due to this, it is estimated that uranium recovery begins immediately upon injection of lixiviant into the ore body 101. Once the lixiviant passes through the ore body, to the recovery wells, and back to the processing plant, production of uranium can begin. Low pH ISR operations sometimes circulate a more concentrated mining solution to pre-condition a wellfield prior to flows from that area being directed to the precipitation plant.

PLS Processing

In conventional ISR operations, PLS feed concentrations are typically quite low (often measured in terms of mg/liter). This requires the use of IX processing equipment to concentrate the ore in order to facilitate efficient precipitation and ultimately packaging of the finished product (yellowcake, for uranium). In addition, the volume of solution required to recover the ore and achieve annual production requirements, in conventional ISR operations, can be quite high. In processing operations involving higher grade ore obtained from underground or open pit mining operations, processing typically requires a SX circuit to efficiently separate the ore from impurities and concentrate the ore to similarly allow for efficient precipitation.

By comparison, the proposed processing method described herein recovers PLS feed concentrations that are free from impurities and much higher grade (often measured in terms of g/liter), thus allowing for processing on surface to be conducted without the need for IX or SX and with comparatively much smaller volumes of solution. Laboratory test work has demonstrated that concentrations of the PLS in the proposed processing method have been consistently between approximately 10 g/l and approximately 27 g/l, with impurities that are able to be separated out prior to final precipitation. Eliminating the need for IX or SX circuits results in a reduction of capital costs as well as personnel and reagent consumption during operations. As a result, operations are streamlined, and operating costs are also reduced.

The uranium ISR process proposed involves the dissolution of the water-soluble uranium compound from the mineralized host sands at low pH ranges. The low pH solution can dissolve and mobilize the uranium, allowing the dissolved uranium to be pumped to the surface. The uranium-rich solution can be transferred from the production wells to the nearby processing/precipitation plant for uranium removal, drying/calcining, and packaging.

Figure 5:
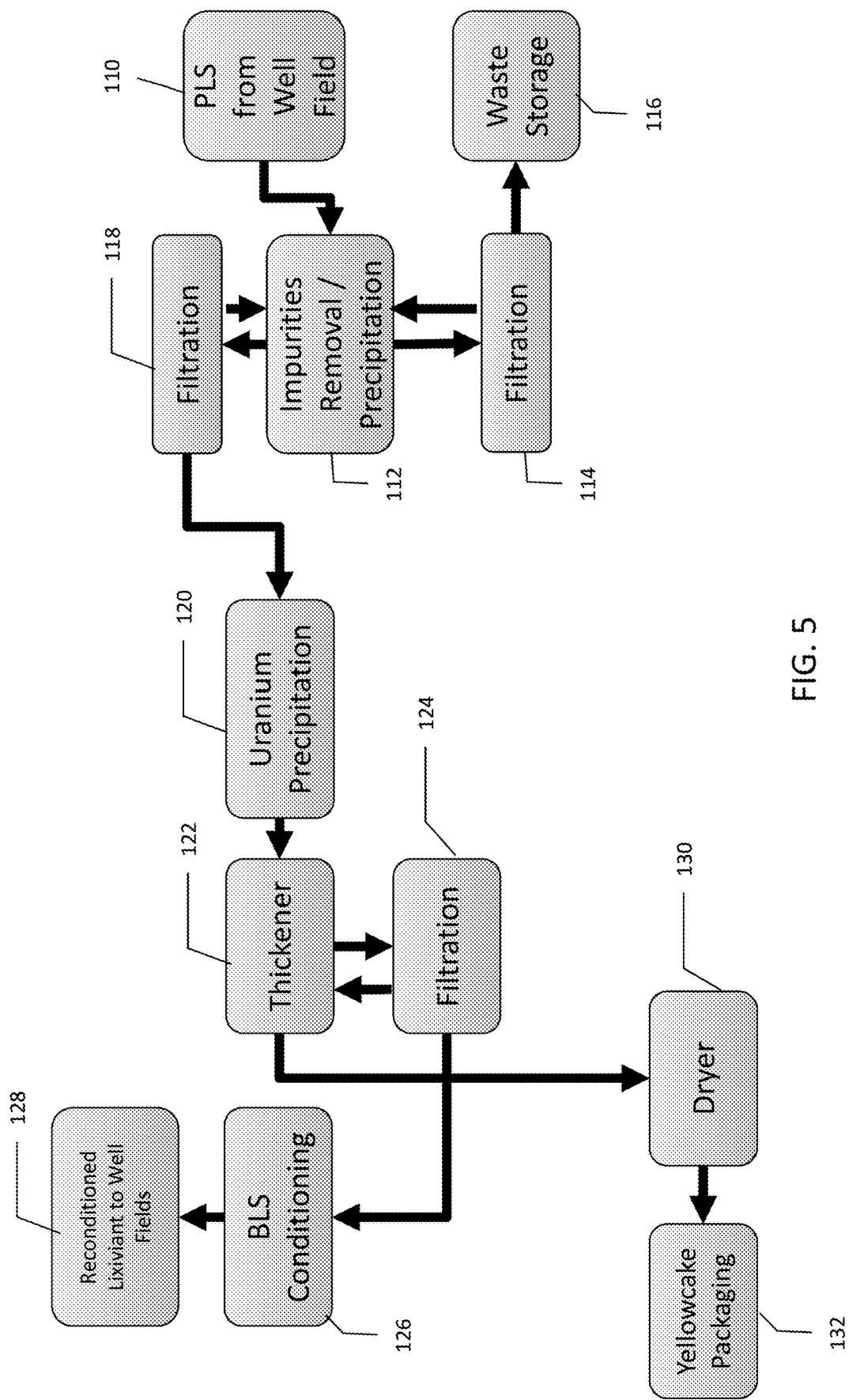
FIG. 5 is a flowchart providing an overview of the modified ISR processing method.

FIG. 5 shows the proposed ISR process as a flow diagram, starting with the recovery of PLS from the wellfield 101 and including the following major processing circuits: impurities removal 112 (i.e. iron/radium removal), uranium precipitation 120, dewatering 122, drying 130, and packaging 132. Other solution circuits include waste storage 116 and Barren Leach Solution (BLS) conditioning 126.

Figure 6:
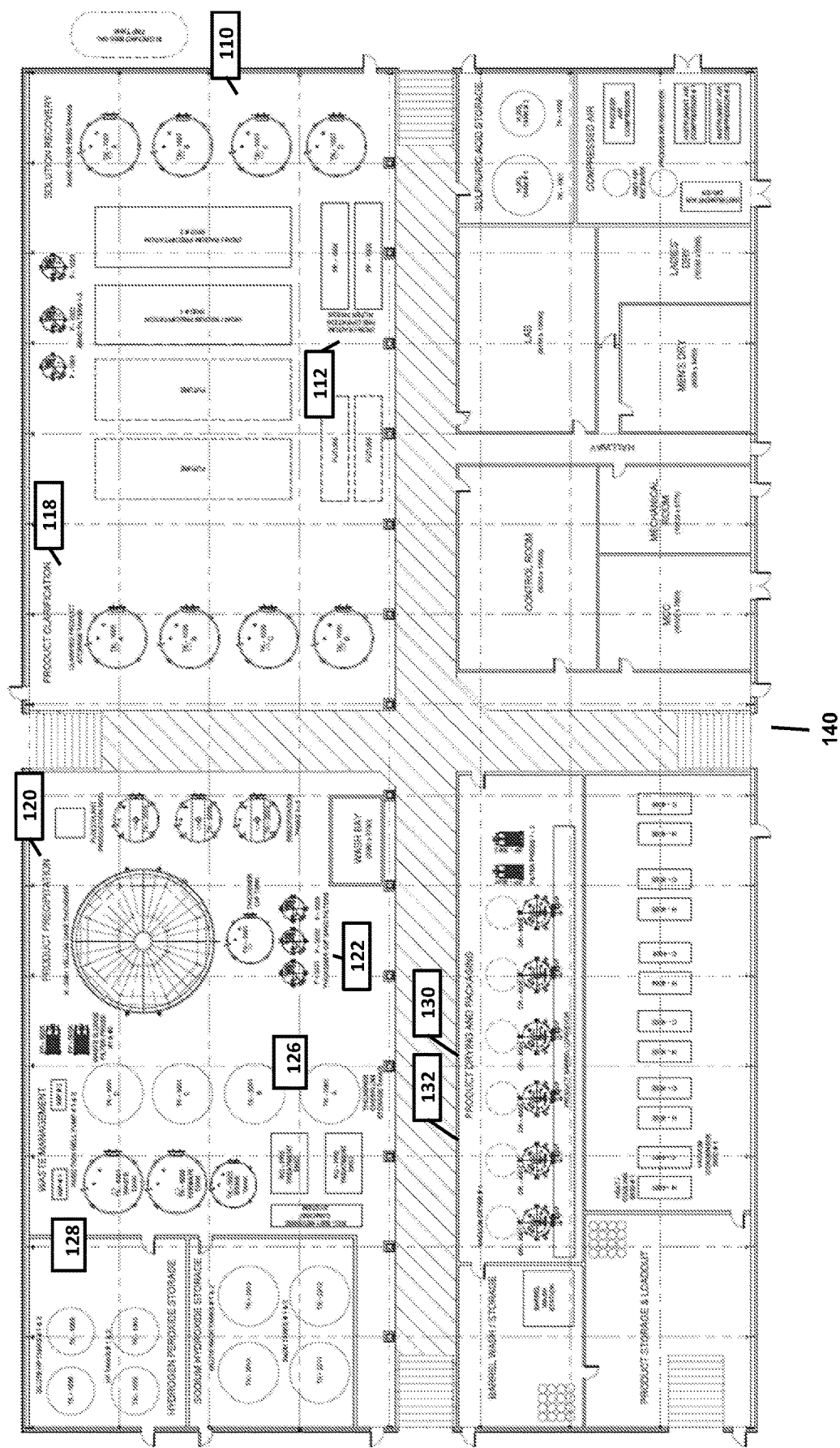
FIG. 6 is a plan layout view of an embodiment a processing plant suitable for the modified ISR processing method.

FIG. 6 shows a plan layout view of a processing plant 140 designed to support the proposed ISR process. The uranium recovery or processing plant 140 would house most of the process equipment in a prefabricated building made preferably of metal. Auxiliary equipment consists of filtration systems, bulk chemical storage, process solution storage tanks, water treatment and a control room.

The processes proposed have been designed to efficiently recover uranium and to reduce operating costs by recycling and re-using most of the solutions inside each circuit. The system has been designed to constantly remove impurities to control the level of contaminants in the lixiviant and to draw water makeup for the plant from a water well.

First, the PLS containing dissolved uranium from the wellfield 101 is pumped to the precipitation plant for post-processing. The processing system assumes a minimum uranium PLS concentration in the order of approximately 10 g/L. The pH of the incoming PLS to the plant can be constantly monitored; and can be maintained at a specific pH value to ensure the uranium is fully dissolved.

The iron/impurities removal circuit 112 adjusts the pH of the PLS to allow FeOH (Iron Hydroxide) and other metals to precipitate out. It can be appreciated that only a negligible amount of uranium may precipitate in this step.

In filtration 118, the PLS is pumped to a series of agitated tanks where the addition of sodium hydroxide, commonly known as "caustic soda", and barium chloride is progressively injected along with a flocculant. This increases the pH of the solution promotes the formation of metal hydroxides and radium precipitates. The solution flows by gravity to a decanter/settler allowing the precipitates to sink to the bottom and the clear solution to rise to the top. Metal hydroxides and radium complex precipitates can be directed to a filter press where about 90% of the moisture containing uranium rich solution is recovered. The filtered cake with approximately 10% moisture content is disposed of and stored on the special waste pile 116 on surface in a lined area. The solution overflowing from the decanter/settler is filtered in a series of sand filters where entrained precipitate is pumped back to the decanter/settler unit. The clear uranium bearing solution is forwarded to the next processing step, uranium precipitation 120.

Uranium oxide ($U_3O_8$), referred in the industry as "Yellowcake", is recovered from the PLS following the uranium impurities removal circuit 112 and filtration 118. The yellowcake precipitation circuit or, uranium precipitation 120 involves precipitating yellowcake slurry by adding a strong base and Hydrogen Peroxide to the PLS. Hydrogen peroxide is injected in a 3-stage series of agitated tanks to precipitate dissolved uranium. Additional pH adjustment is provided (if required) by further addition of sodium hydroxide.

A thickener step 122 is included to provide time for growth of uranium oxide crystals. The precipitate accumulates at the bottom of the thickener and the Barren Leach Solution (BLS), depleted of uranium, rises to the top. The BLS is cleaned through a series of sand filters 124 prior to reconditioning 126. The precipitated yellowcake product accumulated at the bottom of the thickener is withdrawn at the underflow of the thickener and pumped through a filter press, where excess liquid is removed and circulated back to the thickener 122.

The ISR recovery process circulates lixiviant through the ore body. A ground water well can provide fresh water to the process to offset water losses in the yellowcake drying process. Sulfuric acid and Hydrogen Peroxide are added to the volume of makeup water. The solution is then mixed with the recycled BLS and re-injected at the wellfield. The reconditioned lixiviant 128 is returned back to the well fields 101 to be injected once again into injection wells 102.

The yellowcake slurry is then further dried in a dryer 130 (or calcined) and then packaged as a free-flowing yellowcake in the packaging circuit 132. The yellowcake package can then be sent to a conversion facility to be processed into uranium hexafluoride, one of the steps in the nuclear fuel cycle required to ultimately produce fuel for a nuclear power plant.

Entrained solids particles exiting the filter press are collected and packaged. Fresh water is sprayed on the surface of the cake displaying trapped BLS within the cake reducing the entrainment of contaminants to the dryer. The remaining of the moisture is evaporated in a low-temperature (approximately 400° F.) dryer. Water released from the drying process is condensed, collected and reused in the plant for reagents preparation purposes. The product drying activity is a batch process where a specific volume of dewatered yellowcake product can be accumulated in a vessel surrounded with a jacket circulating oil from a bath heated at high temperature. Once the moisture is removed from the yellowcake product, the material can be transferred into steel drums by gravity where it is allowed to cool prior to installing covers.

It can be appreciated that the present system has been designed to be a closed loop system. After the lixiviant travels through the ore body and is processed in the plant (i.e. uranium removed), it is then re-conditioned. The reconditioning steps involve balancing pH and oxygen levels to their original state. The reconditioned lixiviant is then recycled back to the wellfield. The proposed process, when applied in an environment that provides complete containment surrounding the ore body (for example, a freeze dome 203 surrounding the ore body, described herein), may virtually eliminate the recovery of excess water from the formation and thus eliminate the need to treat excess quantities of water diluted mining solutions in the surface processing plant. Eliminating the treatment of excess mining solution has the positive impact of eliminating the need to discharge treated excess solution to the environment—which can be costly and create potentially significant environmental impacts.

Freeze Wall

In conventional ISR operations, containment is typically achieved by natural impermeable layers in the geological strata and/or by created a natural drawdown of the water table towards the ore body (pumping more solution out of the ground than is injected into the ground). Where there are high water flows and movements through the ore body and host sandstone, it may be impractical to create a depression in the water table. Where the geological strata do not allow for sufficient containment and where it may be impractical to draw down the water table, the freeze wall 203 is herein proposed to surround the ore body 101 using a plurality of freeze wells 205 configured in the form of a "dome" to artificially contain the lixiviant and resultant PLS. A method of constructing a freeze wall 203 is herein provided. It will be appreciated that the freeze wall denoted by numeral 203 may also be referred to herein as a "freeze dome" or "domed freeze wall" interchangeably while referring to the same principles discussed herein.

Ground freezing is typically applied in civil or mining applications where there is concern about both water ingress and ground stability during excavation through water bearing formations. The purpose of the freeze wall 203 is to isolate the ore body 101 from the surrounding sandstone and regional ground water, without freezing the actual ore body.

In this example, the ore body 101 is underlain by competent basement rocks 307, which create a low permeable boundary below the ore body. Above the ore body 101, however, is highly altered and permeable sandstone, leaving the ore body devoid of a naturally occurring aquitard above the deposit. By inducing a freeze dome 203 just above the ore body 101 and anchoring the extents of the freeze dome 203 into the basement rock 307 surrounding the ore body, an aquitard equivalent can be created in the sandstone surrounding the deposit.

Ground freezing involves the process of circulating chilled brine through a pattern of holes drilled through the ground. The brine is contained within the freeze holes 205 via double casing, where the brine is injected within the inner casing and returns along the annulus between the inner and outer casings. The chilled brine extracts heat from the surrounding rock by forced convection, with the rate of heat transfer being a function of brine temperature, flow rate, and ground thermal properties. Accordingly, the first step in the development of the freeze dome 203, and its associated system, includes the drilling and installation of freeze wells 205 that collectively form the freeze wall or dome 203.

Figure 7:
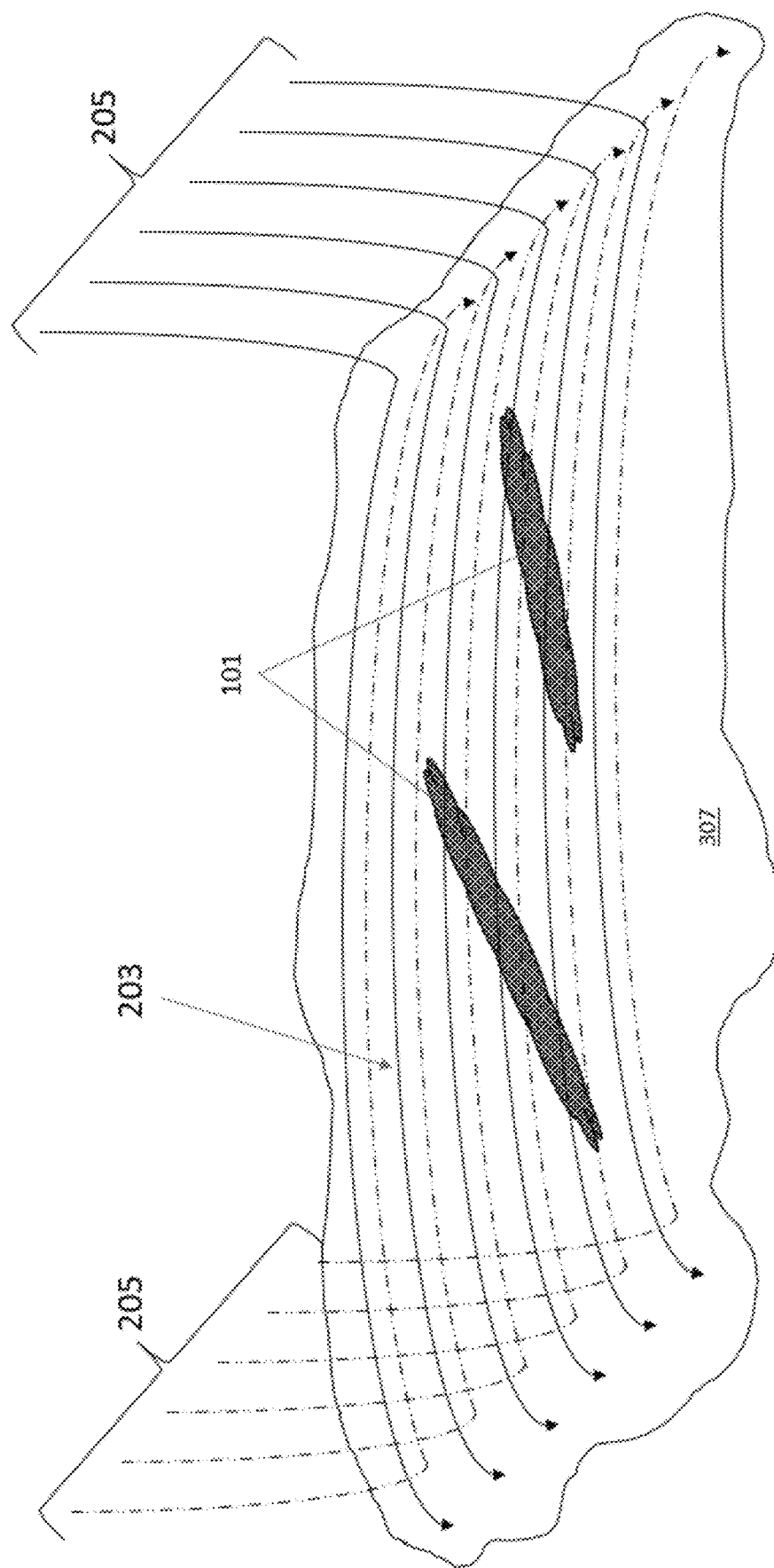
FIG. 7 is a schematic perspective view of a freeze dome design.
Figure 8:
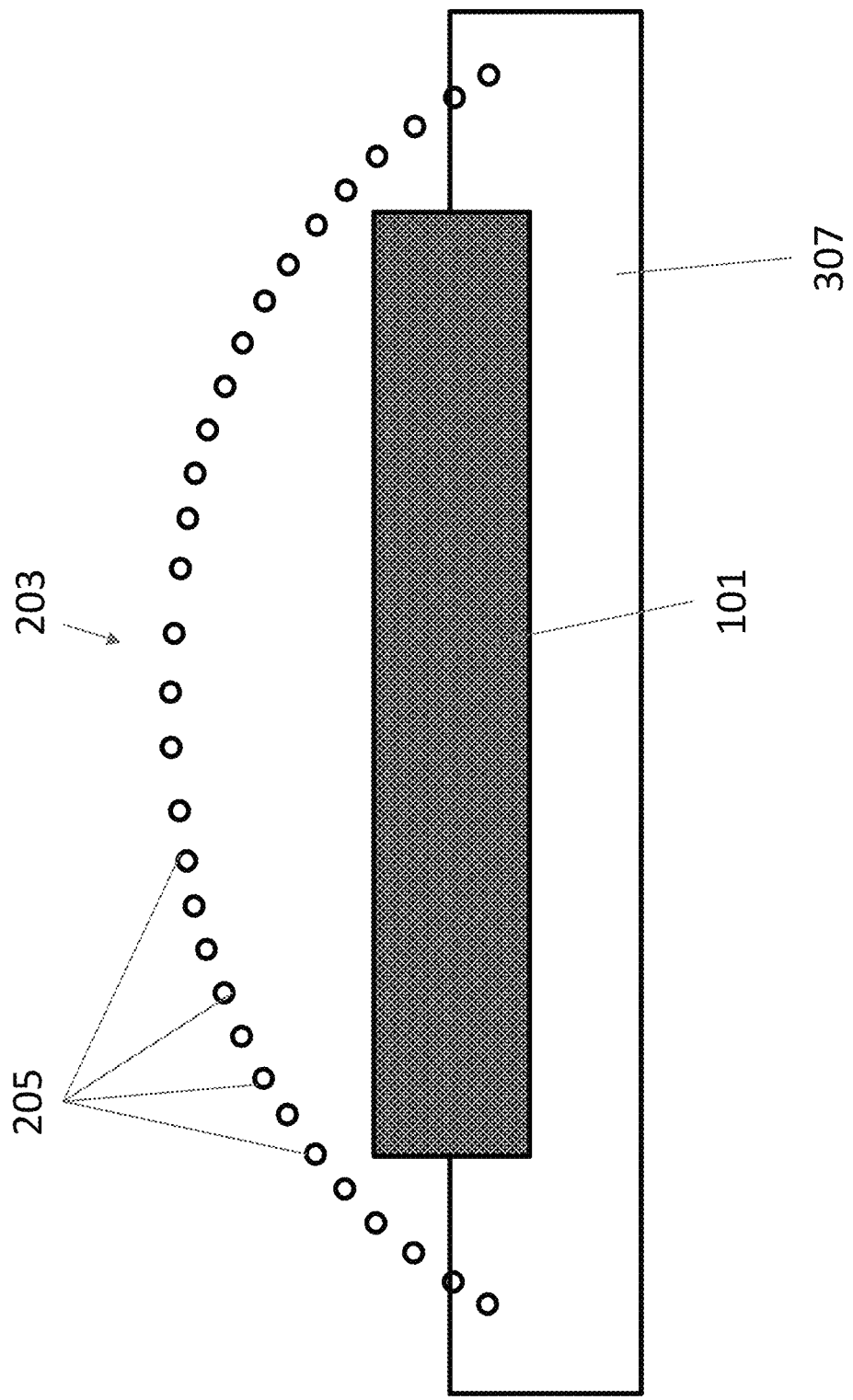
FIG. 8 is a schematic cross-sectional elevation view of a freeze dome arch, taken along line A-A of FIG. 10.
Figure 13:
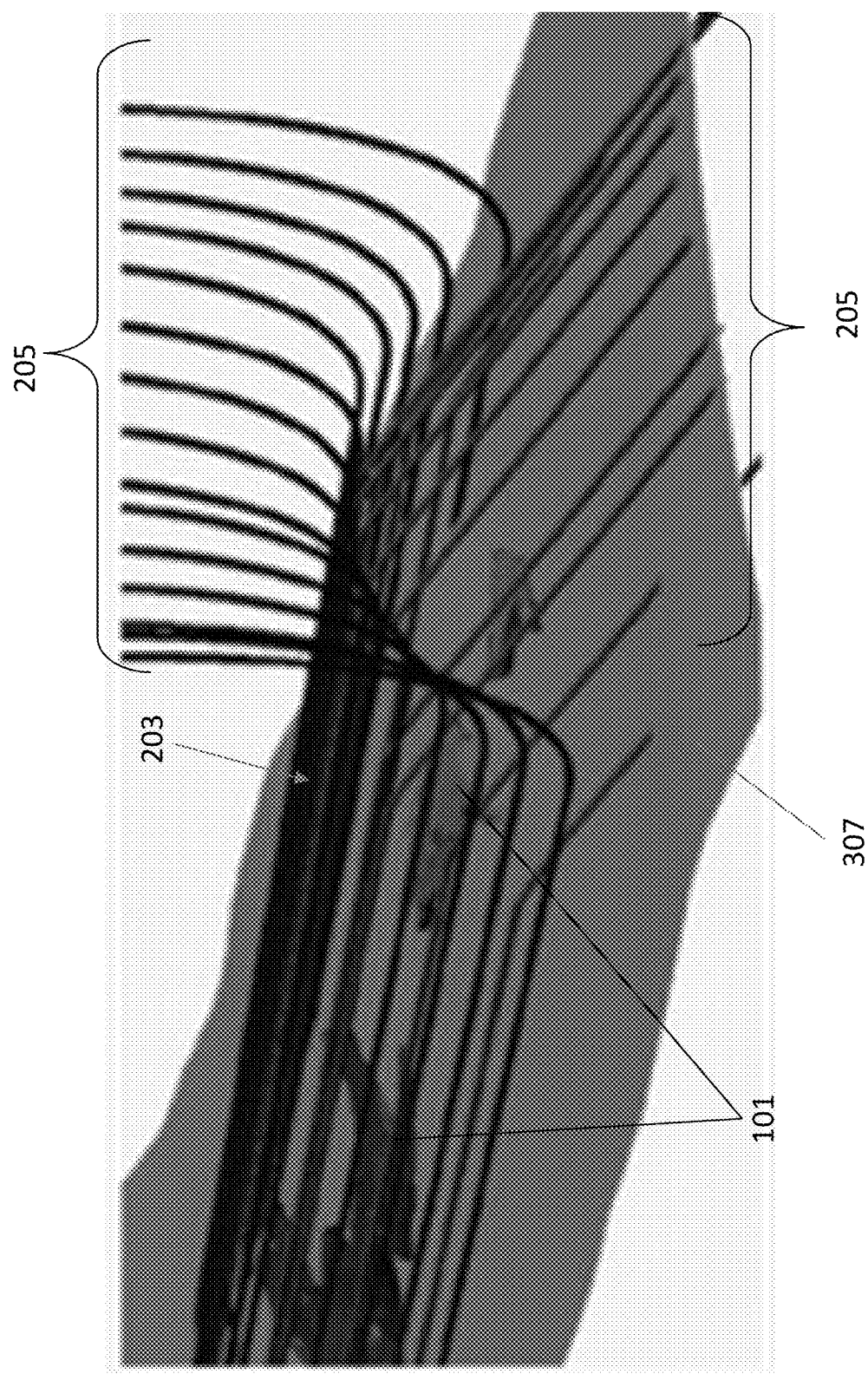
FIG. 13 is an enlarged isometric view of the freeze dome design.

FIG. 7, FIG. 8 and FIG. 13 are illustrative of a freeze dome design. In this example, the freeze dome design includes an arched configuration of adjacent freeze wells 205 that run parallel to the ore zone 101, approximately 27 meters above the basement rocks. The freeze wells 205 that make up the left and right sides of the arch can be drilled along the strike of the ore and just inside the basement rock 307. This serves to key the toes of the arch to the low permeability basement rock 307—as illustrated in FIG. 8. The drilled wells 205 can be spaced approximately 5 meters apart along the perimeter of the arch and may be drilled via directional drilling—originating at surface, travelling vertically initially until being curved laterally to follow the strike of the deposit along the arch pattern for approximately 900 meters. Once on the far side of the ore body, the wells 205 can be curved down to terminate into basement rock 307—as illustrated in FIG. 13, which provides an enlarged isometric view of one end of the freeze dome 203. This effectively keys the ends of the freeze dome 203 into the basement rock 307. Half of the freeze wells 205 will originate on one end of the ore body, while the other half of the freeze wells 205 will originate on the other end of the ore body—allowing for the freeze wells 205 to be keyed into the basement rock 307 on both ends of the ore body 101. In FIG. 13, it can be seen that the freeze wells 205 originating from opposite ends travel side by side over top of the deposit for approximately 900 meters (to create the arch structure shown in cross-section in FIG. 8) and are then directed downwards to terminate into and thus key the entire freeze dome 203 into, the underlying basement rock 307.

Figure 12:
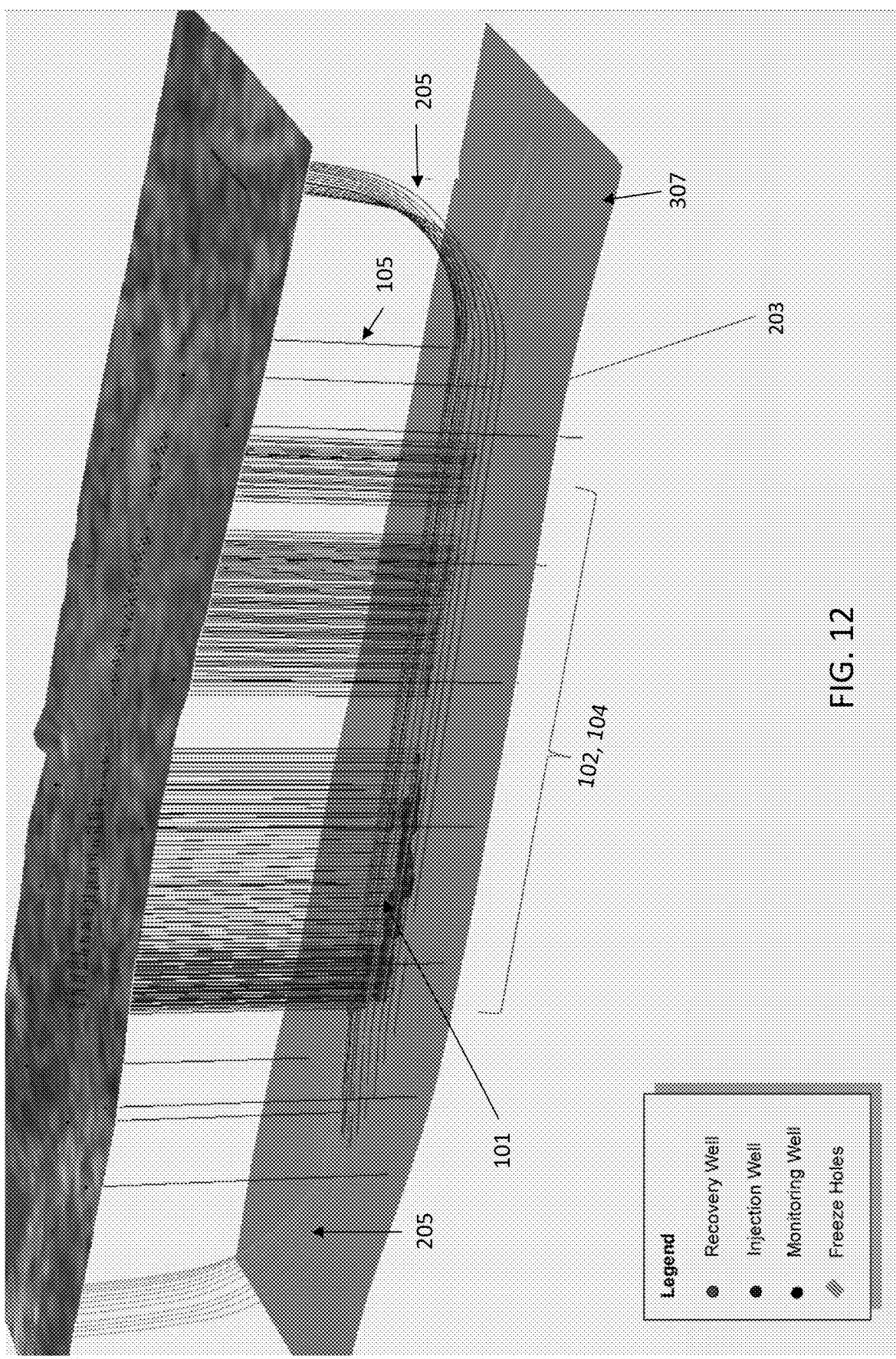
FIG. 12 is an isometric view of a typical wellfield layout.

It can be appreciated that drilling the freeze wells 205 from both ends (or sides) of the ore body 101 (as shown in FIGS. 7, 12, and 13) is only one illustrative example of achieving the dome shaped freeze wall 203 according to the principles discussed herein. For example, a first set of directionally drilled freeze wells 205 (as shown in FIGS. 7, 12, 13) could instead be drilled from only one side of the ore body 101 and a set of vertical, near-vertical, or angled wells used to close off the end of the ore body 101 within the dome underneath the pad from which the directionally drilled wells 205 originate. In one alternative, a set of vertical wells positioned to extend downwardly and through the set of directionally drilled freeze wells 205 can be used to complete the freeze wall 203. In another alternative, a set of angled wells positioned and directed to at least partially intersect the directionally drilled freeze wells 205 can be used to complete the freeze wall 203. Other variations could also be used to achieve both the domed shaped freeze wall 203 design while keying the freeze wells 205 into the basement rock 307.

Figure 9:
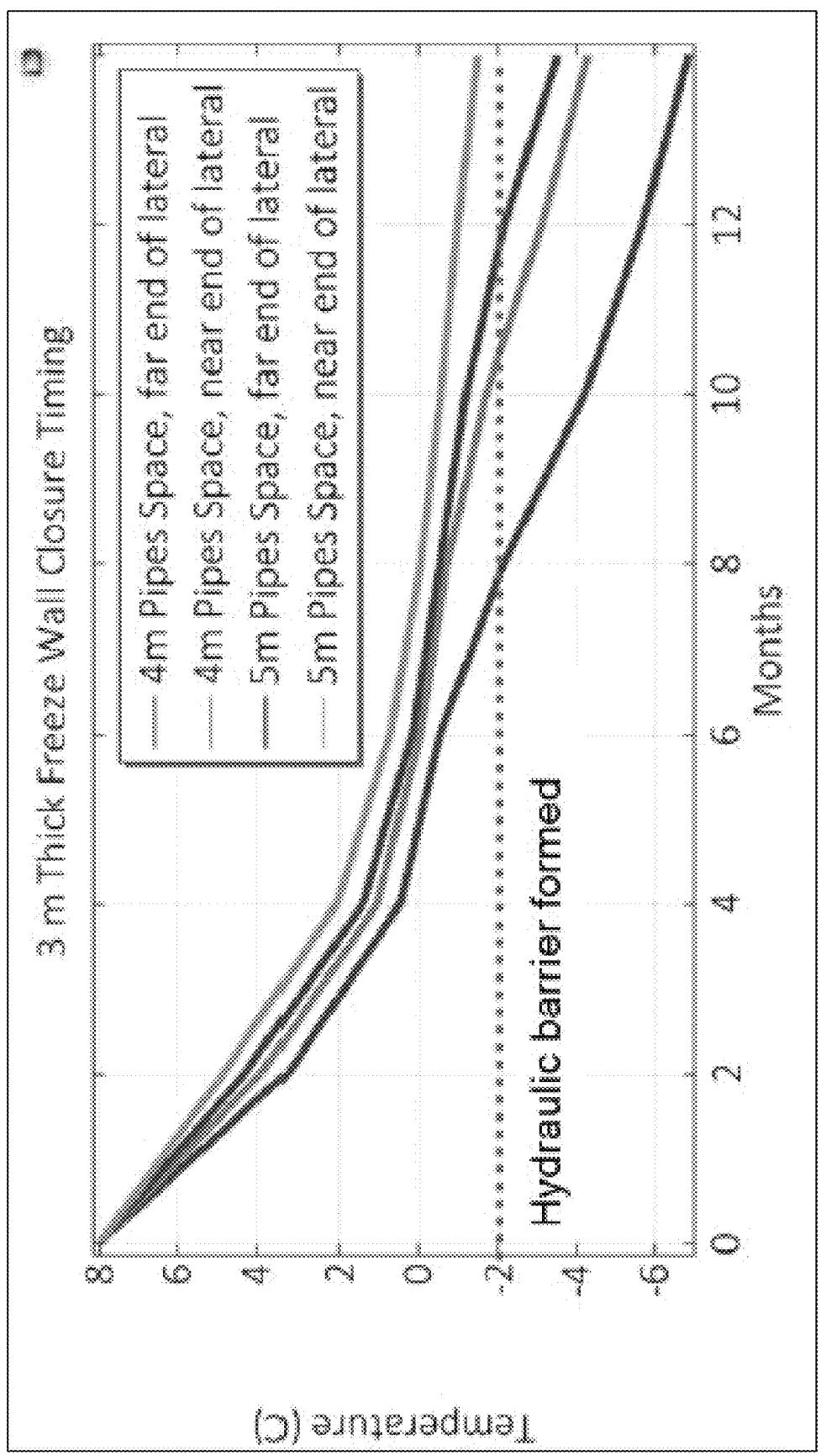
FIG. 9 is a chart showing time required to create freeze wall.

A freeze plant may be required at each end of the deposit 101 where the freeze wells 205 originate from surface. The freeze plant can be constructed concurrent with drilling operations such that it is operational once the freeze wells 205 have been installed. The combined capacity of both freeze plants, in this example, is estimated at 1500 tons of refrigeration. The refrigerant is a chilled brine, assumed to be calcium chloride 30% by weight, operating at a plant heat exchanger brine cold side temperature of −35° C. The brine flow rate can be about 8 cubic meters per hour which allows for a higher heat coefficient, an achievable brine fluid velocity in the main header line that services the hole collars and freeze plant, as well as minimized brine warming along the 900 meter lateral pipe section where heat is removed from the ground. FIG. 9 provides a graphical depiction of s the time required to construct the freeze wall 203 in certain conditions.

The freeze plant system included in this design is modular, meaning that a shutdown in any one unit would not result in a complete plant downtime. When the ground is frozen between the freeze wells 205, and the frozen barrier grows in thickness, there is often enough thermal inertia in the system to allow for a mechanical shutdown of an extended duration. This means that natural thawing can be a long, slow process especially in high water content zones where significant amounts of latent heat must be added to facilitate phase change.

Ground freezing for water control and ground stability enhancement is a relatively low risk procedure and common practice in the uranium and potash mining industry for ground excavations in ground conditions similar to that above. The primary objective of the freeze dome, however, is to create a hydraulic barrier wall 205 and as such, the freeze criteria were developed to ensure there is frozen wall thickness adequate only to prohibit passage of water.

Figure 10:
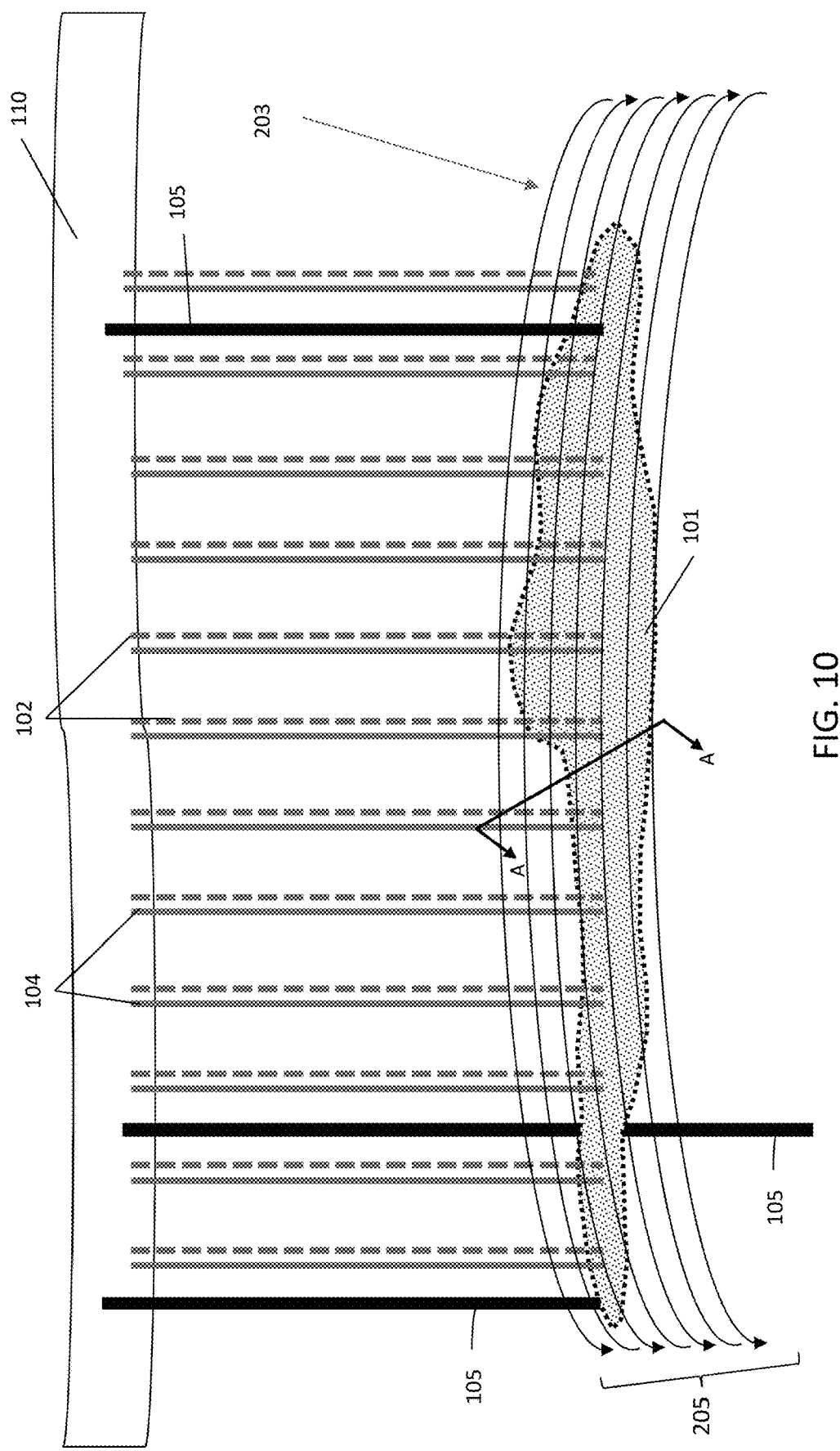
FIG. 10 is a schematic isometric view of a typical wellfield layout.

FIG. 8 illustrates the dome-shaped pattern in a cross-section taken along line A-A from FIG. 10. FIG. 8 provides the horizontal nature of the freeze wells 205 travelling above the ore body. This unique dome-shaped pattern is in contrast to typical freeze walls, which to this point have only been drilled in straight lines (vertically or inclined) and do not follow a vertically downward from the surface, to horizontally above, to vertically keyed into the basement rock 307 pattern as shown in FIG. 7 FIG. 12, and FIG. 13.

Figure 11:
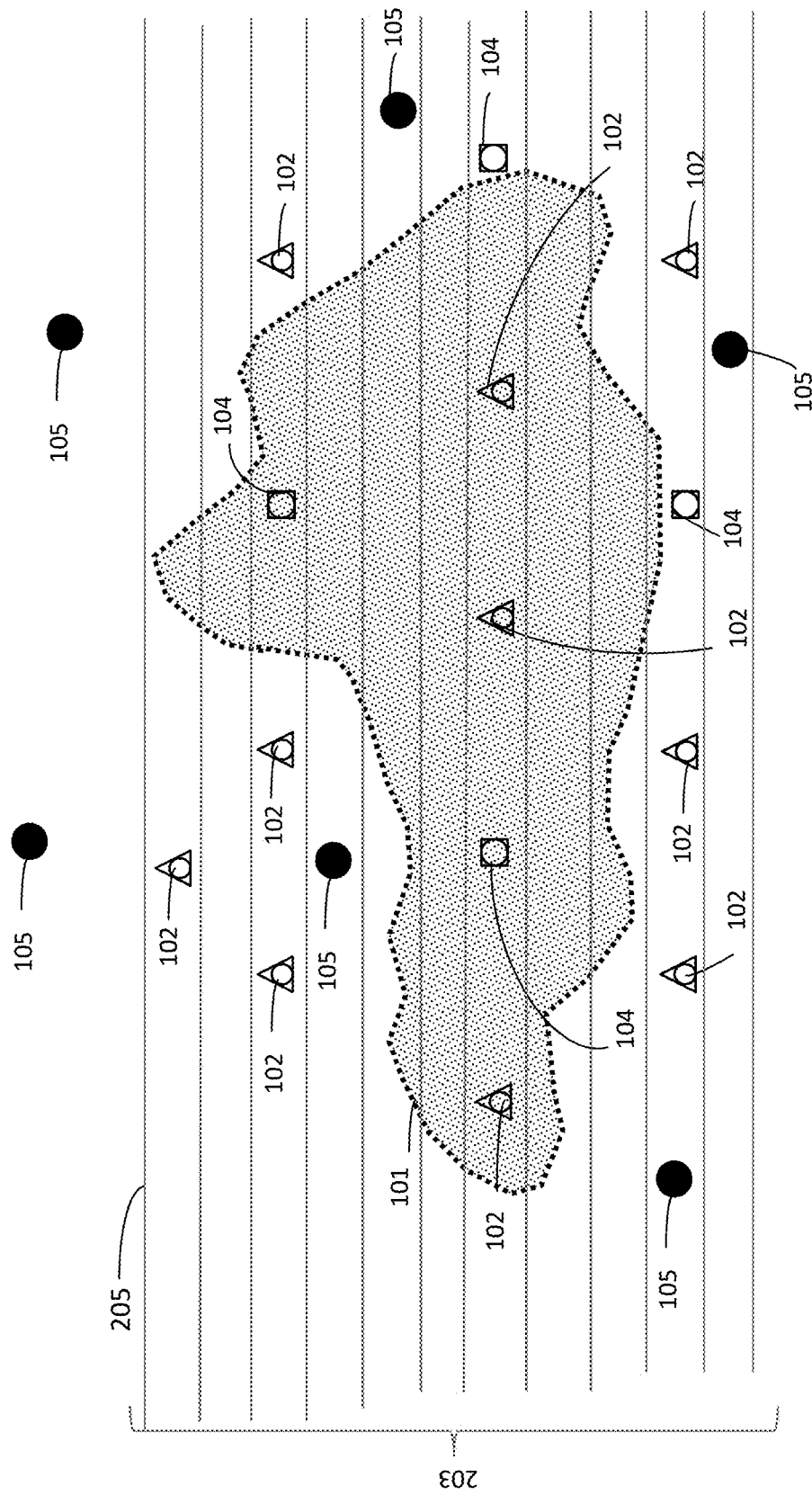
FIG. 11 is a topographical view of the wellfield layout, showing the freeze holes.

The ISR wellfield will be installed through the freeze dome 203. In this example, the wellfield will be completed as a series of vertical wells 102 and 104 piercing the freeze dome 203 in between the various freeze wells 205 that run along strike of the ore body 101. FIG. 10 provides an indicative illustration of how the ISR injection wells 102 and recovery wells 104 will travel through the freeze dome 203 into the ore body 101 to allow for the process of ISR mining to be completed within the confines of the freeze dome 203. FIG. 11 shows a topographical view of the wellfield layout—showing the placement of the injection wells 102, the recovery wells 104 such that they do not intersect with the freeze wells 205. Monitoring wells 105, are also shown on the outside of the freeze dome 203, to monitor for and detect any excursions from the mining chamber created by the freeze dome 203.

As noted above, one advantage of using a freeze dome 203 in conjunction with ISR mining is that it eliminates any excess water coming into the formation and thus eliminates the need to treat and discharge any excess solution. Typical ISR operations can have 1-2% of excess water drawn into the ore body from the surrounding groundwater and may then be forced to treat and discharge the excess solution appropriately.

Mitigating ground water ingress, into the mining chamber, also provides operational advantages, as dilution of the lixiviant being circulated between injection and recovery ISR wells can be effectively eliminated. Thus, the volume throughput and reagent consumption in the recovery plant can be controlled. In addition, and as discussed above, a closed loop system is created between the wellfield and the processing plant, which can eliminate the need for excess solution in the processing plant to be discharged to the environment.

Mitigating excursions of lixiviant can provide economic and environmental advantages. By maintaining control of the lixiviant inside the freeze dome 203, recovery of the PLS can be maximized while at the same time preventing the PLS from interacting with the natural ground water outside of the freeze dome 203. Additionally, a freeze dome 203 would simplify the process of restoration by controlling and minimizing the volume of ground impacted by the ISR mining process. Since the entire ore body 101 can be isolated from the surrounding aquifer by the freeze dome 203, production flow rates are anticipated to be essentially equal to injection rates.

If the ore body 101 is high grade (high recovery) then there is a possibility that ground movement due to volume loss may occur underground with the quantity of material that can be dissolved into the lixiviant. To date, test work does not provide evidence of this; however, it is envisioned that the freeze cap can provide ground support to ensure that any potential ground movement due to volume loss not propagate and negatively affect mining.

As shown in FIG. 10 and FIG. 11, a series of monitoring wells 105 can be located outside the perimeter of the freeze dome 203 (both on the side and above) and underneath the deposit 101. These monitoring wells 105 would be used to monitor natural ground water conditions during operations. The spacing of the wells is to be based on hydrogeological assessments.

It can be important to ensure that the lixiviant (found in the injection wells 102) and the PLS (found in the recovery wells 104) do not freeze when travelling through the freeze dome 103 and/or when in transit to the processing plant 140 on surface. This can be ensured by freeze-protecting and/or insulating the ISR wells and/or formulating the lixiviant such that it does not freeze even at temperatures as cold as −30° C. or in extreme operating conditions. A heat trace could also be placed within well casings 102 and 104 if needed to melt frozen lixiviant or PLS.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Although the above principles have been described with reference to certain specific examples, various modifications thereof will be apparent to those skilled in the art as outlined in the appended claims.

The invention claimed is:

1. A method of recovering ore from an ore body in a closed loop system, comprising:
    forming an artificial containment around an ore body, by:
        drilling a plurality of freeze wells to form a freeze wall over and around the ore body that is anchored into a rock formation underlying the ore body to contain the ore body within the freeze wall; and
        completing the plurality of freeze wells to enable a chilled fluid to be circulated in the wells to generate the freeze wall;
    drilling from surface at least one injection well and at least one recovery well;
    injecting a lixiviant solution into at least one injection well to produce a Pregnant Leach Solution (PLS);
    pumping the PLS to the surface using the at least one recovery well;
    transporting the PLS to a processing plant using a piping system; and
    processing the PLS;
    wherein the at least one injection well and at least one recovery well are drilled in a pattern to produce a patterned wellfield; and
    wherein the plurality of freeze wells are drilled by:
        drilling a first set of freeze wells from a first end at surface, by drilling each well in the first set vertically down to a depth above the ore body, redirecting the drill hole horizontally over the ore body, and then again redirecting the drill hole vertically into the rock formation underlying the ore body, to anchor into the underlying rock formation; and
        drilling a second set of freeze wells from a second opposite end at surface, by drilling each well in the second set vertically down to a depth above the ore body, redirecting the drill hole horizontally over the ore body and then again redirecting the drill hole vertically into the rock formation underlying the ore body at the opposite end of the first set of freeze wells.

2. The method of claim 1, further comprising circulating the chilled fluid in the freeze wells to form the freeze wall.

3. The method of claim 2, wherein the chilled fluid comprises a chilled brine.

4. The method of claim 1, wherein outer ones of the first and second sets of freeze wells are drilled along the strike of the ore body and inside the underlying rock formation to laterally anchor the freeze wall.

5. The method of claim 1, wherein the freeze wells are cased drill holes.

6. The method of claim 5, wherein the freeze wells are completed using directional drilling technology.

7. The method of claim 5, wherein the freeze wells are double-cased, comprising an inner casing and an outer casing.

8. The method of claim 7, wherein the chilled fluid is injected within the inner casing and returned through an annulus between the inner and outer casings.

9. The method of claim 1, further comprising installing a freeze plant at each end of the freeze wall and coupling each freeze plant to a respective set of freeze wells.

10. The method of claim 9, wherein the freeze plants are modular.

11. The method of claim 1, wherein the plurality of freeze wells are positioned substantially parallel to pass over the ore body.

12. The method of claim 1, wherein the first set of freeze wells and second set of freeze wells comprise the same or substantially the same number of wells.

13. The method in claim 1, wherein the piping system is freeze protected and/or insulated to ensure the lixiviant and PLS flow continuously throughout.

14. The method of claim 1, wherein the at least one injection well and the at least one recovery well are offset between adjacent freeze wells.

15. The method of claim 1, wherein the lixiviant solution does not freeze in operation.

16. The method of claim 1, wherein the patterned wellfield does not freeze in operation.

17. The method of claim 1, wherein the at least one injection well and at least one recovery well are adapted to be used interchangeably.

18. The method of claim 1, wherein the processing steps further comprise:

removing impurities from the PLS by adjusting the pH of the PLS to allow impurities to precipitate out;

precipitating the ore by adding a strong base and Hydrogen Peroxide to the PLS;

when the ore body comprises uranium, thickening the PLS by dewatering and growing yellowcake crystals;

when the ore body comprises uranium, using a filter press and drying or calcining the uranium to remove excess liquid from the precipitated yellowcake; and packaging the yellowcake.

19. The method of claim 18, wherein the reconditioned lixiviant solution is produced by reverting pH levels and oxygen levels of the PLS to pH levels and oxygen levels of the lixiviant solution.

20. The method of claim 1, wherein the piping system is a closed-loop system adapted to: process the PLS, recondition the PLS to produce a reconditioned lixiviant solution and, recycle the reconditioned lixiviant solution back to the wellfield.

21. The method of claim 1, wherein the natural or artificial containment formed around the ore body ensures that the lixiviant solution is contained within the proximity of the ore body, and within and behind the freeze wall.

22. The method of claim 1, wherein at least one monitoring well is drilled in the wellfield to detect excursions, incursions, leaks and overall pressure of system.

23. The method of claim 1, wherein the freeze wall is dome shaped.

24. A system for recovering ore from an ore body, the system comprising:

a plurality of completed freeze wells forming a freeze wall over and around the ore body that is anchored into a rock formation underlying the ore body to contain the ore body within the freeze wall;

at least one injection well and at least one recovery well;

wherein the plurality of freeze wells enable a chilled fluid to be circulated in the wells to generate the freeze wall;

wherein a lixiviant solution is injected into at least one injection well to produce a Pregnant Leach Solution (PLS);

wherein the at least one recovery well recovers the PLS from the ore body to a processing plant using a piping system to process the PLS; and wherein the at least one injection well and at least one recovery well are drilled in a pattern to produce a patterned wellfield; and wherein the plurality of freeze wells comprise:

a first set of freeze wells drilled from a first end at surface, by drilling each well in the first set vertically down to a depth above the ore body, redirecting the drill hole horizontally over the ore body, and then again redirecting the drill hole vertically into the rock formation underlying the ore body, to anchor into the underlying rock formation; and a second set of freeze wells drilled from a second opposite end at surface, by drilling each well in the second set vertically down to a depth above the ore body, redirecting the drill hole horizontally over the ore body and then again redirecting the drill hole vertically into the rock formation underlying the ore body at the opposite end of the first set of freeze wells.

25. The system of claim 24, further comprising chilled fluid to be circulated in the freeze wells to form the freeze wall.

26. The system of claim 25, wherein the chilled fluid comprises a chilled brine.

27. The system of claim 24, wherein outer ones of the first and second sets of freeze wells are drilled along the strike of the ore body and inside the underlying rock formation to laterally anchor the freeze wall.

28. The system of claim 24, wherein the freeze wells are cased drill holes.

29. The system of claim 28, wherein the freeze wells are completed using directional drilling technology.

30. The system of claim 28, wherein the freeze wells are double-cased, comprising an inner casing and an outer casing.

31. The system of claim 28, wherein the chilled fluid is injected within the inner casing and returned through an annulus between the inner and outer casings.

32. The system of claim 24, further comprising a freeze plant installed at each end of the freeze wall and coupling each freeze plant to a respective set of freeze wells.

33. The system of claim 32, wherein the freeze plants are modular.

34. The system of claim 24, wherein the plurality of freeze wells are positioned substantially parallel to pass over the ore body.

35. The system of claim 24, wherein the first set of freeze wells and second set of freeze wells comprise the same or substantially the same number of wells.

36. The system of claim 24, wherein the freeze wall is dome shaped.

* * * * *